Patented Aug. 28, 1945

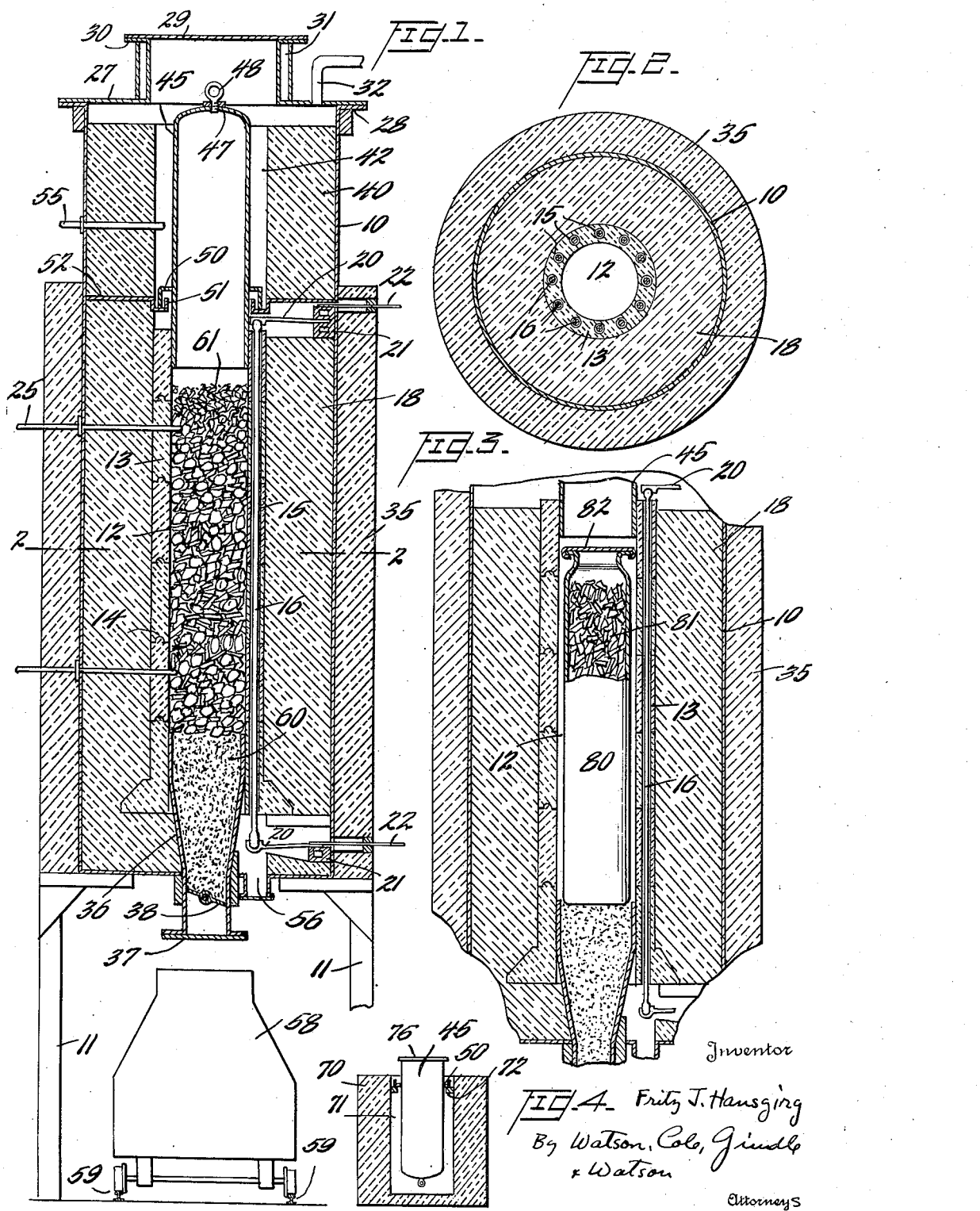

2,383,856

UNITED STATES PATENT OFFICE 2,383,856

APPARATUS FOR PRODUCING METALLIC MAGNESIUM

Fritz J. Hansgirg, Black Mountain, N. C., assignor to North Carolina Magnesium Development Corporation, Asheville, N. C., a corporation of North Carolina Application December 31, 1943, Serial No. 516,494

18 Claims. (Cl. 266—19)

This invention relates to the production of magnesium and has for its general object the provision of novel and improved processes and apparatus for the facile and economic reduction and recovery of the metal from its ores.

There have been many prior proposals for the thermal reduction of magnesium-containing materials and many of these methods involve the final recovery of the magnesium by some sort of sublimation process. For effecting this thermal reduction, a variety of reducing agents have been used, these agents being capable of classification in two distinct groups. The reducing agents of one group form gaseous products of reaction with the magnesium and are usually applied to the oxide ores. Thus, when magnesium oxide is reduced with carbon, a mixture of magnesium metal vapor and carbon monoxide is formed. The second group of reducing agents include such elements or compounds which form solid residual products when the metallic magnesium vapor is evolved. As examples of these latter reactions there may be mentioned the reduction of magnesium compounds with silicon, aluminum, calcium carbide, and silicon carbide.

In pursuing the first mentioned process in which carbon is used as the reducing agent, the procedure is carried out in two steps. First the ore is reduced with carbon and the gaseous products of reaction are quenched, forming an impure magnesium dust. The second step involves the recovery of pure metallic magnesium by the sublimation of the magnesium dust in a retort. On the other hand, when using the reducing agents of the second group, the magnesium-containing materials are mixed with the selected reducing agent, pressed into tablets or briquettes, and then heated in suitable retorts to liberate the magnesium and condense it.

The chief differences between the processes involving the first group of reducing agents and those employing the second group reside in the fact that the metallic magnesium in the first case is already present as such in the dust and has merely to be evaporated, whereas in the case of the second group the magnesium does not exist in the starting material as the free metal but is liberated in the gaseous state during the heating process and is recovered by condensing it in solid form. Thus it will be seen that in the first case a true sublimation process takes place, while in the second case, there is merely a condensation in solid form of the metal liberated during the heating process.

The differences just mentioned involve practical considerations in providing a suitable retort for the reactions, the temperatures to which the reaction chamber must be heated being different in each case. In the first case mentioned where the magnesium is already present as a free metal in the dust produced by the carbo thermal reduction method, the temperatures necessary for the evolution of the magnesium from the dust depends only upon the boiling constants of the metal at different pressures. Under a vacuum of 1 mm. the magnesium can be effectively evaporated from the dust at about 600° C. In the second type of method, however, wherein the magnesium is formed by reduction during the heating process, the evolution of the magnesium vapor depends not only upon the boiling constants of temperature and pressure, but upon the nature of the reducing agent applied and the temperature necessary to effect the reducing reaction. For example, when using calcium carbide or aluminum in a vacuum of 1 mm., a temperature of approximately 1000° C. is required, and using silicon or ferro-silicon, a temperature in the neighborhood of 1150° C. is required.

It is a comparatively easy matter to maintain such vacuum in mild steel retorts with the comparatively low temperatures necessary to evaporate the magnesium from the dust recovered from the thermal reduction with carbon. The equipment, built up with mild steel, described in my United States Patents 2,309,643, 2,309,644, and 2,310,188 can be used. However, for the direct reduction of magnesium compounds with reducing agents of the second group, where temperatures of from 1000° C. to 1150° C. are involved, mild steel equipment has not been used. Instead, it has been the practice in the industry to use small sized retorts made of high chromium-nickel alloyed steels of considerable wall thickness for carrying on these processes. Such equipment is very expensive not only in the actual first cost per unit, but with the smaller retorts much additional labor and expense is involved in the more frequent charging and discharging of the retorts. Furthermore, to maintain adequate production the number of retorts must be greatly increased.

It is, therefore, an important object of the present invention to provide novel processes and equipment which can be readily employed in pursuing either of the above mentioned general methods. Provisions for charging and discharging the retort, and for condensing the magnesium vapors according to either process are made, and the retort or furnace may be raised to the high temperatures necessary for the second process while still maintaining the proper temperature differential between the reaction portion and the condensing portion of the apparatus.

In equipment formerly employed in pursuing these general processes, a retort is used which is inserted with a gas tight connection into an electric resistance furnace, which furnace is also evacuated to release external pressure from the wall of the retort. In operation, the retort is brought to a filling station, charged with the shaped magnesium dust, either in the form of tablets or of a paste made with hydrocarbon oil, and then the retort is inserted into the furnace. After the sublimation process is completed the whole retort is cooled, the magnesium is withdrawn from the upper part, and the residue discharged by dumping.

While such methods are suitable in certain cases, they are generally inconvenient and considerable expense is involved in the transportation of the retorts, in the evacuation of the outer furnace chamber as well as the vacuum control inside the retort, and in the time necessary to cool the entire retort.

The present invention in its preferred embodiment contemplates the provision of a retort furnace structure wherein steel is used only for the outside wall or shell in order to provide for the maintaining of the necessary vacuum in the system, and the other portions of the furnace which are heated to the high temperatures necessary in the reduction are constructed of refractory material. Thus this present system dispenses with portable retorts consisting of either mild or high alloy steel, for either the sublimation or reduction temperatures. In the present system the charging and discharging of the furnace is effected by the use of traveling bins or cars and this charging and discharging may be done without cooling the furnace. Provision is also made for the condensing of the magnesium vapors within a portable vessel which is insertable into and removable from the upper portion of the retort, and which may also be used as a melting pot or crucible for the recovered magnesium.

Other objects and features of novelty will be apparent from the following specification when read in connection with the accompanying drawing in the certain embodiments of the invention are illustrated by way of example.

In the drawing:

Figure 1 is a view in vertical section of a retort or furnace for the reduction or sublimation of magnesium in accordance with the principles of the invention;

Figure 2 is a horizontal sectional view through the furnace as taken on line 2—2 of figure 1;

Figure 3 is a fragmentary vertical sectional view of the central part of the furnace, showing an alternative means for containing the raw materials; and Figure 4 is a diagrammatic view in vertical section of a melting furnace into which the condensing vessel may be introduced.

In the somewhat diagrammatic sectional view comprising Figure 1 of the drawing, an outer wall or shell is shown at 10, and forms an impervious container which may be sealed and evacuated during the process. This wall or shell 10 may be made of mild steel since it is protected from the high temperatures of the reaction chamber by provisions which will be later described. The outer container 10 may be supported upon suitably braced structures 11 at a suitable elevation for charging and discharging the retort.

Within the axial portion of the container 10, beginning near the bottom thereof and extending for approximately two thirds of the height is an inner reaction chamber 12 having preferably cylindrical walls 13 formed of refractory ceramic material capable of withstanding temperatures upwardly 1200° C. and being resistant to magnesium vapors. It is preferred that no binder be used in forming the refractory walls 13, therefore the wall is preferably made of superposed annular refractory rings having interlocking joints as suggested at 14. These bricks or annular sections may be made of substantially pure magnesium oxide, alumina, aluminum carbide, or zirconium oxide. It is important that the materials of which the refractory chamber are constructed contain no easily reducible oxides such as iron oxide or ferrites. Such materials are readily affected by magnesium vapors and would cause the furnace to collapse.

Each section of the wall 13 is provided with an annular series of vertical openings 15, which when the wall is erected, are in registry with those of the other sections and form an annular series of elongated bores through which electric resistance heating elements such as the rods 16 may pass. Such elements are well known in the art and may be made of high alloy chromium steel, silicon carbide, or even carbon. In order to efficiently and rapidly conduct the heat from these resistance rods to the reaction materials in the chamber 12, the ceramic material of which the walls 13 are formed should be of a very dense nature and should have a maximum heat conductivity. For this purpose magnesia bricks which have been burned at a high temperature or zirconium oxide bricks are especially suitable.

Between the reaction chamber wall 13 and the outer steel wall 10 of the container, there is disposed the heat insulated material 18. The nature and thickness of this material is so selected as to maintain a temperature differential between the heated wall 13 and the shell 10, so that when the reaction chamber is heated to approximately 1200° C., the wall 10 of the outer container will not be heated to a temperature much above 500° C. At this temperature the mechanical strength of the mild steel wall 10 will still be sufficient, even under the vacuum applied to the interior of the retort furnace.

Each of the resistance rods 16 is provided at its upper and lower end with spring contact arms 20, these arms being set in the cooled terminal blocks 21 adjacent to the wall 10 around the periphery of the container, and connectors 22 lead from these blocks through vacuum tight insulated means provided in openings in the wall 10. The upper and lower ends of the rods 16 and the heads of the spring connectors 20 are somewhat enlarged to prevent overheating at the contact points. A suitable source of current is supplied to the connectors 22 so as to maintain the reaction chamber 12 at the desired temperature for either simple sublimation or reduction of the magnesium. The temperature control may be effected by the thermostatic pyrometers indicated diagrammatically at 25.

The top of the container 10 comprises the head 27 which is secured and sealed to the flange structure 28 and this head 27 is provided with a cover or closure 29 which may be sealed to the flange 30, this sealing being protected by the cooled hollow wall structure shown at 31. A pipe 32 is threaded into an opening of the cover or head construction 27 and is connected with a suitable source of subatmospheric pressure. The whole interior of the container 10 may be evacuated. In order that the evacuation, to as low as 1 mm., may be most rapidly effected, the internal insulating material 18 should not be of a too porous nature. While maintaining the heat insulating capacity of the material 18, this material should be of a substantially non-porous character since porous materials give up the air absorbed therein very slowly, making it difficult to reach and to maintain a high vacuum.

In order to prevent an undue loss of heat from the furnace, external insulation 35 is applied to the outer side of the wall 10 from the bottom of the container up to and slightly beyond the upper end of the reaction chamber 12. This insulating material may be of any suitable nature whether porous or not.

Fitted within the lower end of the heating chamber 12 is the slightly conical discharge hopper 36. The lower end of the discharge outlet may be covered by a closure plate 37 and a dump valve 38 may be provided as shown.

Above the reaction portion of the furnace, means are provided for condensing the magnesium vapors evolved in the evaporating chamber 12. An annular body 40 of suitable non-porous insulating material is disposed within the upper portion of the container 10 and adjacent its wall, thus forming a central substantially cylindrical chamber 42 within which there is inserted a condenser bell or vessel 45. This condenser vessel is preferably a substantially cylindrical structure having its open end directed downwardly into the upper end of the reaction chamber 12, and preferably fitting rather closely within the wall 13. The closed end of the vessel 45 is disposed upwardly and provided with a vent opening 47 which may be closed by the member 48 which comprises a lifting ring having a plug adapted to be threaded into the opening 47 when the vessel 45 is to be removed from or replaced in the retort through the opening normally covered by the closure 29.

The outer wall of the vessel 45 is provided with an annular angular flange 50 which cooperates with the U-shaped annular sealing ring 51 carried by the plate 52 supported by the furnace wall 10 and the blocks of insulation 18 occurring between the electric connections 20, 21. The sealing ring 51 may be filled with a fine powder of magnesium oxide to prevent the magnesium vapors from escaping past the vessel 45 into the upper portion of the retort.

It will be noted that there is no external insulation around the condenser portion of the container corresponding to the outer insulation layer 35 disposed around the reaction portion. Also the insulating properties of the material 40 are selected so that the condensing temperature of the vessel 45 may be maintained between 400 and 500° C. The temperature in the condensing chamber 42 of the retort may be controlled by means of the pyrometer 55.

In order to provide access to the electrical connections at the upper ends of the resistance rods 16, the head 27 of the furnace may be removed as well as the insulation 40, and the connections at the lower ends of these rods are made accessible by the hand holes 56 in the lower wall of the container 10.

Wheeled bins or cars 58, running upon the tracks 59 may be provided to receive the residues from the reactions when the discharge hopper 36 is dumped.

In operation, the starting materials are charged into the chamber 12 of the retort furnace upon a bed 60 consisting of a portion of the residues from the previous operation. The reaction chamber is filled up to the level 61 with the material (preferably tablets or briquettes). Then the condenser cylinder or vessel 45 is inserted, the closure 29 sealed, and the whole system within the steel container 10 put under vacuum. The current is turned on, if this has not previously been done, as for example during a prior run, and the temperature regulated according to pyrometers 25. When using calcium carbide or aluminum as the reducing agents, the temperature in the reaction chamber should be approximately 1000° C., while when silicon or ferro-silicon is used, the temperature should be approximately between 1100° C. and and 1200° C.

The cycle of operation will last from six to twenty-four hours depending upon the size of the furnace and the charge. At the completion of the run, the metallic magnesium will have condensed as a solid ring within the cylindrical condenser vessel 45. The vacuum is then released either by the admission of air or of nitrogen or of some inert gas, depending upon whether or not the carbon contained in the residue is to be preserved.

The closure 29 is removed, the ring plug 48 applied to the vessel 45 and the latter withdrawn from the retort. The bottom flange 37 of the hopper is removed, the valve 38 opened, and enough of the residue discharged into the bin or car 58 to leave a bed at 60 for the next succeeding run.

After a certain degree of vacuum is reached and the process well under way, the reaction will make its own vacuum as the magnesium vapors in the beginning combine with the gases contained in the retort, that is, with most of the gaseous content except hydrogen, hydrocarbons, and the inert gases, argon, neon, and helium. This produces a very high vacuum in the retort, and if hydrocarbons and hydrogen can be excluded, it is only necessary to pump to about 50 mm. of mercury, and the magnesium vapors will take care of the rest. Since the inert gases comprise about one percent of the air, a vacuum of 0.5 mm. will be produced. If the retort is pumped up to about 10 mm., the eventual vacuum will be about 0.1.

After it is removed from the retort with this condensed incrustation of magnesium metal, the vessel 45 is preferably inverted—that is, disposed with its open end uppermost—and inserted into an electric or gas fired furnace up to the ring 50, which serves as a means for supporting the vessel, as shown diagrammatically in Figure 4 of the drawing. In this figure the melting furnace is indicated generally by the reference numeral 70 and is provided with an inner heating chamber 71 within which the vessel 45 is disposed. Suitable brackets or annular supporting ring are provided in the melting furnace as indicated at 72 and this arrangement provides a support upon which the ring 50 of the vessel 45 rests. A suitable flux is inserted in the vessel and a cover plate 76 applied to the open end, whereupon the magnesium is melted directly in the condenser vessel and then cast from the vessel directly into ingot molds. After cleaning the condenser vessel it is again used in the retort furnace as already described. It is advantageous to make the condenser vessel 45 of a chromium steel alloy so that it may readily stand repeated subjection to the melting operation.

In Figure 3 of the drawing there is shown a modification of the invention particularly adaptable to the sublimation of magnesium from the crude dust produced by the carbo-thermal process. The magnesium dust is tabletted or briquetted and charged into a thin steel cylinder such as the one shown at 80 in Figure 3, the briquetted dust material being indicated at 81. The upper open end of the cylinder 80 may be closed by means of a thin sheet of magnesium which is shown at 82 crimped about the flanged neck of the cylinder and which melts away during the run. The cylinders may be charged and sealed in an automatic machine if desired and they are lowered into the furnace with great facility. The magnesium is sublimed and collected and withdrawn by means of the bell or vessel 45 as already described, and after the run is completed the charging cylinder 80 may be withdrawn from the furnace. The temperature in the case of this reaction is maintained at approximately 600 to 700° C.

Various changes and modifications may be made in the modifications of the invention disclosed herein without departing from the scope of the invention as defined by the following claims.

Having described the invention what is claimed as new and desired to be secured by Letters Patent is:

1. A retort for the recovery or refining of metallic magnesium which comprises, in combination, a heating chamber having walls of refractory material resistant to magnesium vapors, a source of heat for said chamber, a metal outer container enveloping said chamber, heat insulation between the refractory walls of said chamber and of said outer container, a vessel within the upper portion of said container within which vessel the magnesium vapors are condensed.

2. A retort for the recovery or refining of metallic magnesium which comprises, in combination, a heating chamber having walls of refractory ceramic material resistant to magnesium vapors, a fluid source of heat for said chamber, a metal outer container enveloping said chamber, heat insulation between the refractory walls of said chamber and of said outer container, a vessel within the upper portion of said container within which vessel the magnesium vapors are condensed, and means for evacuating said container.

3. A retort for the recovery or refining of metallic magnesium which comprises, in combination, a heating chamber having walls of refractory material resistant to magnesium vapors, a source of heat for said chamber, a metal outer container enveloping said chamber and said source of heat, heat insulation between the refractory walls of said chamber and of said outer container, a vessel within the upper portion of said container within which vessel the magnesium vapors are condensed, and heat insulating material on the exterior of said container so constructed and arranged as to provide a temperature differential between that portion of the container which surrounds the heating chamber and that which surrounds the condensing vessel.

4. A retort for the recovery or refining of metallic magnesium which comprises, in combination, a heating chamber having walls of refractory material resistant to magnesium vapors, electric resistance heating elements adjacent said walls and means for connecting said elements with a source of electrical energy, a metal shell surrounding said heating chamber and extending upwardly beyond the chamber, a vessel within the upper portion of said shell within which vessel the magnesium vapors are condensed, heat insulation between the walls of said chamber and said shell, and heat insulation upon the exterior of that portion of said shell which surrounds the heating chamber.

5. A retort for the recovery or refining of metallic magnesium which comprises, in combination, a heating chamber having walls of refractory material resistant to magnesium vapors, electric resistance heating elements within said walls and means for connecting said elements with a source of electrical energy, a metal shell surrounding said heating chamber and extending upwardly beyond the chamber, a vessel within the upper portion of said shell within which vessel the magnesium vapors are condensed, heat insulation of low porosity between the walls of said chamber and said shell, and heat insulation upon the exterior of that portion of said shell which surrounds the heating chamber, and means for establishing sub-atmospheric pressure within said shell.

6. A retort for the recovery or refining of metallic magnesium which comprises, in combination, a heating chamber having walls of dense refractory material of high heat conductivity and resistant to magnesium vapors, electric resistance heating elements within said walls and means for connecting said elements with a source of electrical energy, a metal shell surrounding said heating chamber and extending upwardly beyond the chamber, a vessel within the upper portion of said shell within which vessel the magnesium vapors are condensed, heat insulation between the walls of said chamber and said shell, and heat insulating material on the exterior of said container so constructed and arranged as to provide a temperature differential between that portion of the container which surrounds the heating chamber and that which surrounds the condensing vessel.

7. A retort for the recovery or refining of metallic magnesium which comprises, in combination, an airtight container, within the lower portion of which is disposed a heating chamber having refractory walls spaced from and insulated from the walls of said container, electric heating means within the thickness of the walls of said chamber, a removable vessel within the upper portion of said container within which vessel the magnesium vapors are condensed, a sealed opening through which said vessel may be removed and replaced, and means for evacuating said container.

8. A retort for the recovery or refining of metallic magnesium which comprises, in combination a metal airtight container, within the lower portion of which is disposed a heating chamber for directly receiving the material to be treated having refractory walls spaced from and insulated from the walls of said container, a source of heat for said chamber, insulation on the exterior of said lower portion of said container, a removable vessel within the upper portion of said container within which vessel the magnesium vapors from the treated material are condensed, a sealed opening through which said vessel may be removed and replaced, and means for evacuating said container.

9. A retort installation for the recovery or refining of metallic magnesium which comprises, in combination, a stationary container having built into its lower portion a heating chamber within which the material to be treated is disposed and within which magnesium vapors are formed, a bell-like vessel removably supported in downwardly opening position within the upper portion of said container within which vessel said vapors are condensed, a gas seal between the wall of the removable vessel and the stationary wall of said container, and a vacuum connection with said container at a point above said seal.

10. A retort installation for the recovery or refining of metallic magnesium which comprises, in combination, a container having in its lower portion a heating chamber within which magnesium vapors are formed, a bell-like vessel removably supported in downwardly opening position in the upper portion of said container within which vessel said vapors are condensed, a gas seal between the wall of the vessel and the wall of said container, a small opening in the upper end of said vessel, and a vacuum connection with said container at a point above said seal.

11. The retort installation as set forth in claim 9 in which there are provided an opening in the end wall of the condensing vessel through which the container may be more readily evacuated, and a removable plug for said opening, said plug carrying means for the connection of handling instrumentalities for removing, transporting and replacing the vessel.

12. A magnesium recovery system which includes, in combination, a retort and a separate melting furnace, a chamber in said retort and a chamber in said melting furnace, a vessel closed at one end and provided with a radial projection on its outer wall, supporting brackets on the inner walls of both of said chambers, whereby said vessel may be supported in inverted position in the retort chamber to condense the magnesium vapors, and in upright position within the melting chamber.

13. A magnesium recovery system which includes, in combination, a retort and a separate melting furnace, a chamber in said retort and a chamber in said melting furnace, a vessel closed at one end and provided with an annular flange on its outer wall at an intermediate point along its height, an annular projection on the inner walls of both of said chambers, whereby said vessel may be supported in inverted position in the retort chamber to condense the magnesium vapors, and in upright position within the melting chamber.

14. A system according to claim 13 in which the annular flanges and projections on the vessel and on the retort chamber wall are angular in cross section and interlocked to provide a gas seal.

15. A portable combined condenser bell and melting crucible for magnesium recovery which comprises a vessel having an annular side wall and an end wall, said end wall having a small gas vent therein and a removable plug for the vent permitting the vessel to be used as a crucible when applied to the vent, and projections on the outer wall of said vessel providing supporting means for the vessel whether in inverted position in a retort or in upright position in a melting furnace.

16. A retort for the recovery or refinement of metallic magnesium which comprises, in combination, a metal container; a heating chamber disposed within said container and constructed of dense refractory material which is resistant to corrosion by magnesium vapors; refractory and insulating material of dense structure, and consequently of relatively low insulating qualities, interposed between the outer walls of said chamber and the inner walls of said metal container; a jacket of porous and thus more efficient heat insulation surrounding the exterior wall of said container; means for heating said chamber, said means being disposed adjacent said chamber and within the dense insulating material; means for condensing magnesium vapor evolved in said chamber; and means for evacuating said container as a whole.

17. A retort for the recovery or refinement of metallic magnesium which comprises, in combination, a container constructed of metal capable of resisting a high vacuum at temperatures of up to about 500° C.; a heating chamber disposed within said container and constructed of refractory material which is resistant to corrosion by magnesium vapors and capable of withstanding temperatures in the neighborhood of 1000° C. to 1200° C.; refractory and insulating material of dense structure, and consequently of relatively low insulating qualities, interposed between the outer walls of said chamber and the inner walls of said metal container; a jacket of porous and thus more efficient heat insulation surrounding the exterior wall of said container; means for heating said chamber, said means being disposed adjacent said chamber and within the dense insulating material; means for condensing magnesium vapor evolved in said chamber; and means for evacuating said container as a whole.

18. A retort for the recovery or refinement of metallic magnesium which comprises, in combination, a container constructed of mild steel capable of resisting a vacuum of approximately 1 mm. of mercury at temperatures of up to about 500° C.; a heating chamber disposed within said container and constructed of refractory material which is resistant to corrosion by magnesium vapors and capable of withstanding temperatures in the neighborhood of 1000° C. to 1200° C.; refractory and insulating material of dense structure, and consequently of relatively low insulating qualities, interposed between the outer walls of said chamber and the inner walls of said metal container and capable of furnishing a temperature gradient from about 1200° C. at the heating chamber to about 500° C. at the container wall; and a jacket of porous and thus more efficient heat insulation surrounding the exterior wall of said container; means for heating said chamber located at the walls thereof; means for condensing magnesium vapor evolved in said chamber; and means for evacuating said container as a whole.

FRITZ J. HANSGIRG.